Patented Jan. 13, 1925.

1,523,182

UNITED STATES PATENT OFFICE.

HENRY V. DUNHAM, OF MOUNT VERNON, NEW YORK.

DRY SATIN WHITE AND PROCESS OF MAKING SAME.

No Drawing. Application filed February 10, 1923. Serial No. 618,398.

*To all whom it may concern:*

Be it known that I, HENRY V. DUNHAM, a citizen of the United States, residing at Mount Vernon, in the county of Westchester and State of New York, have invented certain new and useful Improvements in Dry Satin White and Processes of Making Same, of which the following is a specification.

The product known in the paper-coating industry as "satin white" is made by the addition of aluminum sulfate to calcium hydroxid, and is supposed to consist of a mixture of calcium aluminate, and calcium sulfate, usually with some free calcium hydroxid. It may also contain impurities such as silica, iron, etc., from the raw materials employed.

Satin white is generally marketed in the form of a paste containing from 60 to 70% of water. For use in paper-coating this paste, often mixed with clay, is applied to the paper with a solution of casein or glue, and after drying and passing through the calender the paper exhibits a brilliant, lustrous surface.

The present method of marketing satin white in the paste form is uneconomical, owing to the cost of transport of the large proportion of water and also to the fact that the paste if exposed to freezing temperature becomes almost useless.

Many attempts have been made to overcome these objections by drying out the paste, with the idea of shipping the dry product in bags and re-mixing it with water as required at the paper-mill. It has been found however, that ordinary satin white after drying does not again form a paste when mixed with water, but remains in a hard, granular condition even after long soaking. For this reason, in the case of a product recently put on the market, the dry material is submitted to wet-grinding in a ball-mill or like device, but this operation necessarily adds to the cost.

The object of the present invention is to produce a dry satin white which on simply stirring with water shall rapidly form a slip similar in character to that obtainable from ordinary satin white paste.

The invention consists in treating the satin white paste, which may be prepared in the usual manner, with a water-soluble substance of the kind indicated below, and drying, whereby a mixture is obtained which readily softens in water, and on stirring forms a slip or suspension similar to that obtained from ordinary satin white paste, which can be applied in the usual manner as a paper coating. The added substance may combine chemically, or not, with one or more of the constituents of the paste, provided that the resulting product after drying possesses the desired property of mixing readily with water to form a smooth slip which can be used in place of that prepared from ordinary satin white paste.

I have found that there are several classes of substances which may be added in comparatively small amount to satin white paste for this purpose. As examples of several classes of substances, which can be used may be mentioned (1) soluble carbohydrates, including dextrine, glucose, cane sugar and other sugars; (2) water-soluble oils including sulphonated oils, wax emulsions, and soaps; (3) animal or vegetable glues, albumens and albumoses; (4) water-soluble salts which possess the desired properties, such as borax and common salt.

It is understood that in naming the above substances, I do not limit my invention to the examples given, as it is evident that a large number of substances might produce the same effect while being too costly for commercial use. On the other hand, many water-soluble substances, such as calcium chloride and zinc chloride, do not have this effect, but when added to satin white paste produce, on drying, extremely hard products.

In order to present more fully my method of making the improved dry satin white, I give herewith a number of examples:

*Example 1.*

2000 pounds of satin white paste, containing 70% of water, are placed in a suitable mixing apparatus. A solution of 30 pounds of commercial glucose in 100 pounds of water is then slowly added with continuous stirring. After thoroughly mixing, the product is removed and dried in any suitable manner.

*Example 2.*

2000 pounds of satin white paste are placed in a mixing machine and mixed with a solution of 60 pounds of a good grade dextrine dissolved in 200 pounds of water. The product is removed and dried as in Example 1.

*Example 3.*

40 pounds of bone-glue or hide-glue, are soaked in 300 pounds of water for a few hours. The glue is then gently warmed until dissolved and, after cooling, is added to 2000 pounds of satin white and the paste dried as in Example 1.

*Example 4.*

To 2000 pounds of satin white paste 30 pounds of Turkey red oil dissolved in 300 pounds of water are added. After thorough mixing, the paste is removed and dried as in Example 1.

The amount of substance added, and also the concentration of the aqueous solution as added, may vary according to the specific properties of the substance and those of the paste used, and in some cases a mixture of two or more substances may be employed. No exact general formula can be given, since the satin white pastes supplied by different manufacturers are seldom alike, and it is necessary to determine the most suitable substances by tests.

Without limiting myself to proportions, the following are given, as examples of quantities and concentrations of solutions, to be added to 2000 pounds of ordinary satin white paste (containing initially about 70% of water) before the drying operation.

30 to 60 pounds of cane sugar in 50 to 100 pounds of water; 35 pounds of common salt in 100 pounds of water; 33 pounds of borax mixed with 100 pounds of water; 60 pounds of wax emulsion (consisting of 16 pounds of Japan wax, 4 pounds of borax and 40 pounds of water) diluted with 50 pounds of water. Similar amounts of other waxes such as bayberry and candelilla can be used in this formula.

I claim:

1. The process which comprises adding to satin white paste any water-soluble substance which has the property of causing the dried product on mixing with water to assume the condition of a smooth paste substantially free from hard lumps and grains and thereafter drying the mixture.

2. A new product which consists of a dry satin white in the form of lumps, flakes or powder, possessing the property of mixing readily with water to form a paste substantially free from lumps and granules, without the necessity of grinding.

In testimony whereof I affix my signature.

HENRY V. DUNHAM.